United States Patent
Klinghult et al.

(10) Patent No.: US 9,274,330 B2
(45) Date of Patent: Mar. 1, 2016

(54) OPTICAL FILTER ARRANGEMENT AND A METHOD FOR ADJUSTMENT THEREOF

(75) Inventors: Gunnar Klinghult, Lund (SE); Mats Wernersson, Helsingborg (SE)

(73) Assignees: Sony Corporation, Tokyo (SE); Sony Mobile Communications AB, Lund (SE)

( * ) Notice: Subject to any disclaimer, the term of this patent is extended or adjusted under 35 U.S.C. 154(b) by 9 days.

(21) Appl. No.: 13/250,030

(22) Filed: Sep. 30, 2011

(65) Prior Publication Data

US 2012/0105963 A1 May 3, 2012

Related U.S. Application Data

(60) Provisional application No. 61/409,562, filed on Nov. 3, 2010.

(30) Foreign Application Priority Data

Nov. 19, 2010 (EP) .................................... 10191956

(51) Int. Cl.
*G02B 26/00* (2006.01)
*G02B 5/28* (2006.01)

(52) U.S. Cl.
CPC .............. *G02B 26/001* (2013.01); *G02B 5/284* (2013.01); *G02B 5/287* (2013.01); *G02B 5/288* (2013.01); *G02B 26/007* (2013.01)

(58) Field of Classification Search
None
See application file for complete search history.

(56) References Cited

U.S. PATENT DOCUMENTS

| | | | |
|---|---|---|---|
| 6,031,653 A | 2/2000 | Wang | |
| 6,271,899 B1 * | 8/2001 | Lewis et al. | 349/86 |
| 7,773,291 B2 * | 8/2010 | Smith | 359/321 |
| 2003/0081319 A1 * | 5/2003 | Hsu | 359/579 |
| 2008/0013159 A1 * | 1/2008 | Fallahi et al. | 359/321 |
| 2008/0186508 A1 * | 8/2008 | Kiesel et al. | 356/519 |

FOREIGN PATENT DOCUMENTS

| | | |
|---|---|---|
| EP | 1048962 | 11/2000 |
| EP | 1995622 | 11/2008 |
| GB | 620054 | 3/1949 |
| JP | 59083102 | 5/1984 |
| WO | 9513559 | 5/1995 |

(Continued)

OTHER PUBLICATIONS

DeRose et. al., Pockel's coefficient enhancement of poled electro-optic polymers with a hybrid organic-inorganic sol-gel cladding layer, Applied Physics Letters 89, 131102 (Sep. 25, 2006).*

(Continued)

*Primary Examiner* — Stephone B Allen
*Assistant Examiner* — James McGee
(74) *Attorney, Agent, or Firm* — Renner, Otto, Boisselle & Sklar, LLP

(57) ABSTRACT

The present invention relates to an optical filter arrangement that have a cut wavelength for light passing there through. The optical filter arrangement comprises a stack of a first optical layer and a second optical layer. Further, the optical filter arrangement comprises an electro active polymer material arranged between the first and second layers such that the cut wavelength is adjusted upon application of an electrical voltage to the electro active polymer material.

5 Claims, 4 Drawing Sheets

(56) References Cited

FOREIGN PATENT DOCUMENTS

| WO | 2007142978 | 12/2007 |
| WO | 2010133642 | 11/2010 |

OTHER PUBLICATIONS

Extended European Search Report for corresponding application No. EP10191956.1 dated May 25, 2011.

* cited by examiner

OPTICAL FILTER ARRANGEMENT AND A METHOD FOR ADJUSTMENT THEREOF

RELATED APPLICATION DATA

The present application claims the benefit of U.S. Provisional Application Ser. No. 61/409,562 filed Nov. 3, 2010, and the benefit of European Patent Application No. 10191956.1 filed Nov. 19, 2010, the disclosures of which are herein incorporated by reference in its entirety.

TECHNICAL FIELD

The present invention relates an optical filter arrangement and a method for adjusting a cut wavelength of the optical filter arrangement. Moreover, the present invention relates to a wireless device comprising the optical filter arrangement.

BACKGROUND

Dichroic filters are a type of optical filters that sometimes are referred to as "reflective filters", "thin film filters" or "interference filters". Such dichroic filters can be made by coating a glass substrate with a series of optical coatings. These filters usually reflect an undesired portion of incident light and transmit the remainder of the incident light. A dichroic filter uses a principle of interference where layers of the dichroic filter form a sequential series of reflective cavities that resonate with the desired wave lengths, i.e. the remainder of the incident light that pass through the dichroic filter. Other wavelengths destructively cancel or reflect as the peaks and troughs of the waves overlap.

In a dichroic mirror or filter alternating layers of optical coatings with different refractive indexes are built up upon a glass substrate. The interfaces between the layers of different refractive index produce phased reflections, selectively reinforcing certain wavelengths of light and interfering with other wavelengths. By controlling the thickness and number of the layers, the frequency (wavelength) of the pass band of the filter can be tuned and made as wide or narrow as desired.

Several layer of different refractive index can be sandwiched together to obtain sharper cut of properties.

EAP (Electro Active Polymers) is a polymer material that can change size and shape in response to electrical stimulus.

There exists several types of EAP material, some of them are transparent.

An EAP material that has been used in industrial applications is Polyvinylidene fluoride (PVDF).

PVDF is a very thin plastic film with piezoelectric properties that is transparent.

One advantage with PVDF is the possibility to create very thin layer of this material.

Other piezoelectric plastic materials exist also.

The PVDF film can be coated with a conductive transparent material like Indium tin oxide (ITO), Carbon Nano Tubes (CNT) or Graphene. When a layer of CNT is thin enough, it is transparent.

The electric equivalent shows that EAP material is purely capacitive which means that power will only be consumed at transitions and not at a steady state.

There is a need for an optical filter that improves, in low light conditions, the sensitivity of the optical filter in the Infra red (IR) spectrum. It has then been suggested to use an IR filter in front of the camera with the "notch" filter characteristics showed in FIG. 1a. The filter can also be made to move the cut of wavelength towards higher wavelength, see FIG. 1b.

The "notch" filter can block enough IR light to allow normal colour imaging while the "notch" filter also is transparent for an IR light range with a matched wavelength. This is a compromise when it comes to image quality. Normal daylight is rich in IR and a lot of undesired radiation may be incident on a sensor of a camera provided with such "notch" filter. This has a bad effect on colour reproduction.

SUMMARY

According to a first aspect of the present solution, there is provided an optical filter arrangement, which has a cut wavelength for light passing there through. The optical filter arrangement comprises a stack of a first optical layer and a second optical layer. Further, the optical filter arrangement comprises an electro active polymer material arranged between the first and second layers such that the cut wavelength is adjusted upon application of an electrical voltage to the electro active polymer material.

According to a second aspect of the present solution, there is provided a method for adjusting a cut wavelength of an optical filter arrangement in a wireless device. The optical filter arrangement comprises an electro active polymer material arranged between a first and second optical layer of the optical filter arrangement. The method comprises receiving data from a detecting unit which is comprised in the wireless device and configured to detect incoming light. The received data represents the light detected by the detector. The method further comprises applying an electrical voltage to the electro active polymer material in dependence of the received data such that thickness of the electro active polymer material is adjusted, whereby the cut wavelength is adjusted.

An advantage of the present optical filter arrangement is that it may be used in both low light and day light conditions thanks to the use of an electro active polymer material which enables adjustment of the cut wavelength. Moreover, in some embodiments, the optical filter arrangement may be used as a voltage tunable interference filter.

BRIEF DESCRIPTION OF THE DRAWINGS

The various aspects of embodiments of the present solution, including its particular features and advantages, will be readily understood from the following detailed description and the accompanying drawings, in which.

DETAILED DESCRIPTION

The present invention will now be described more fully with reference to the accompanying drawings, in which embodiments of the invention and prior art are shown.

Figure 2A:
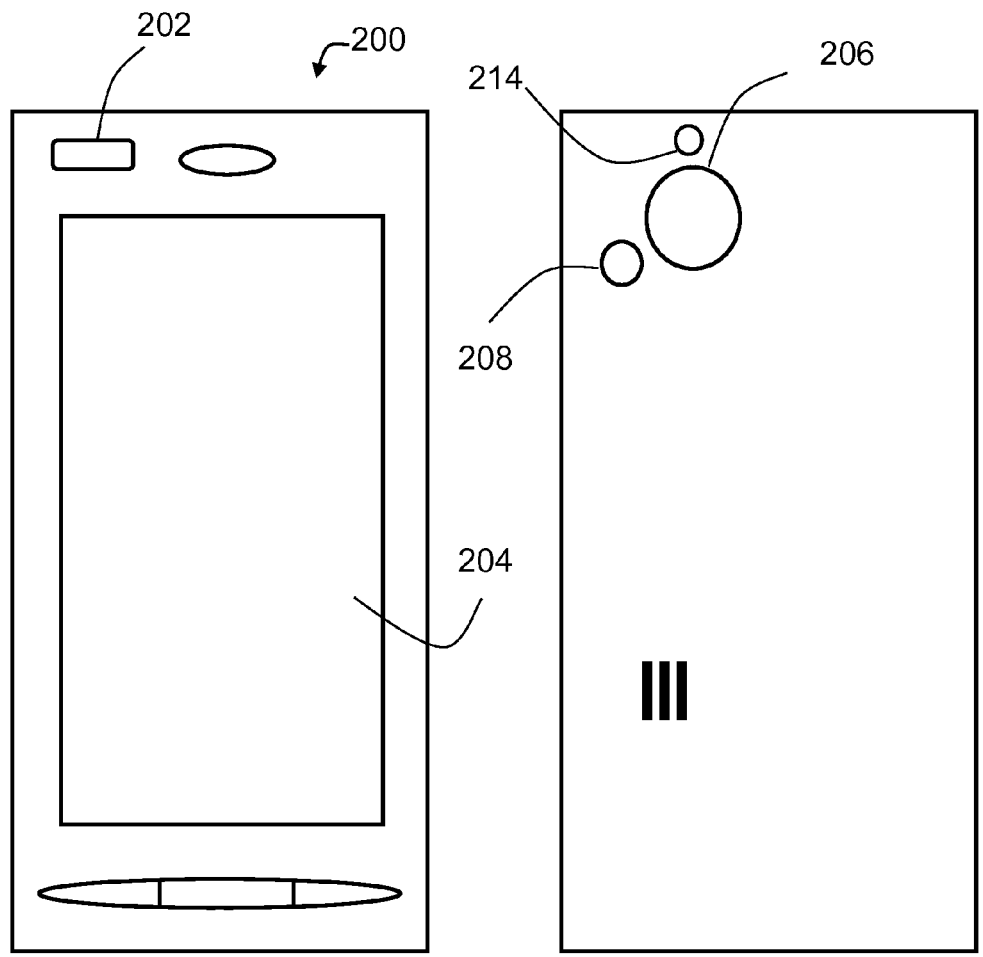
FIG. 2a is a schematic view of the front and a the back of a wireless device.

FIG. 2a depicts the exterior of a wireless device 200, which wireless device 200 may be a mobile terminal, portable electronic device or the alike. The wireless device 200 comprises an optical sensor 202 acting as a first detecting unit, a display 204, a camera unit 206 which comprise a second detecting unit 210, and a first source of light 208. Moreover, in some embodiments, the wireless device 200 further comprises a second source of light 214 in order to enable specific infra red (IR) support.

Figure 2B:
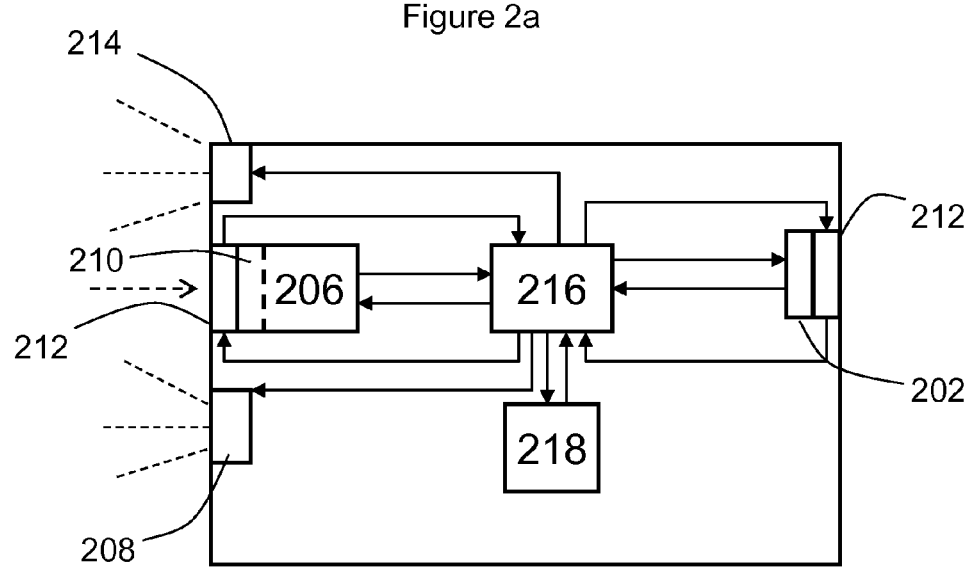
FIG. 2b is schematic block diagram illustrating the inner of a wireless device.

FIG. 2b depicts a portion of the wireless device 200 which involves the camera unit 206 and the first detecting unit 202. Nearby to the camera unit 206 is the first source of light 208 which is adapted to emit a pulsed flash and also to emit continuous light. The term continuous light is defined as light emitted under a period that is longer than the time it takes to take a picture, e.g. 2 seconds. In this mode, the first source of light 208 may stay on for a time which typically may be several seconds. In this mode the first source of light 208 uses a relatively low power as power consumption. The second source of light 214 is located near the camera unit 206. According to some embodiments, the first source of light 208 is adapted to emit the pulsed flash and the second source of light 214 is adapted to emit continuous light or suitable pulsed flash light. The first source of light 208, where appropriate, may be a Light Emitting Diode (LED), or any other suitable source of light, such as an electric light bulb. The second source of light 214 may be an Infra red (IR) LED. The location of the first and second light sources may be near the camera unit 206.

Figure 3A:
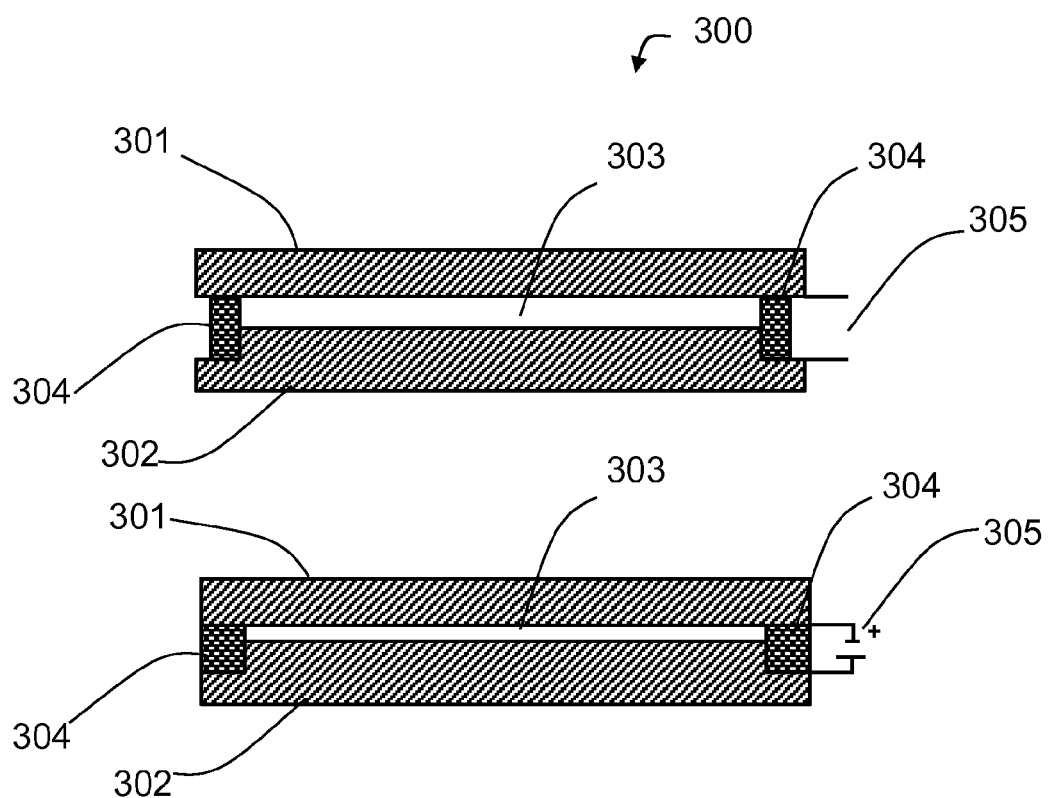
FIG. 3a illustrates a cross sectional view of a schematic, exemplifying optical filter arrangement with an air gap.
Figure 3B:
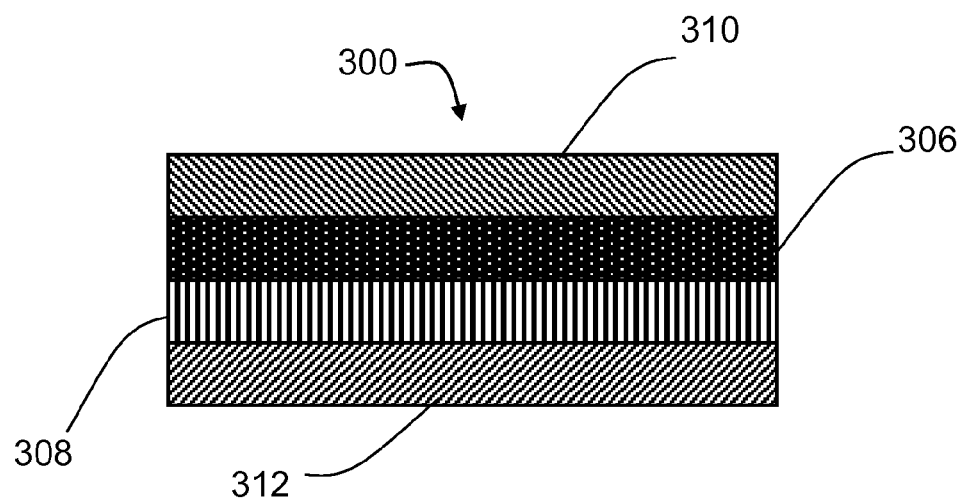
FIG. 3b illustrates a cross sectional view of a schematic, exemplifying optical filter arrangement with multiple layers.

With reference to FIGS. 3a and 3b, there are shown two exemplifying embodiments of the optical filter arrangement according to the present solution. As depicted by FIGS. 3a and 3b, the optical filter arrangement 300 comprises a stack of a first optical layer 301, 310 and a second optical layer 302, 312. Between the first optical layer 301, 310 and the second optical layer 302, 312 is an electro active polymer material 304 arranged such that the cut wavelength is adjusted upon application of an electrical voltage 305 to the electro active polymer material 304. By application of the electrical voltage 305, thickness of the electro active polymer material 304 may be changed. As a result, a distance between the first optical layer 301 and the second optical layer 302 changes. As a consequence thereof, the cut wavelength is adjusted. Hence, in some embodiments, the electro active polymer material may be arranged such that the distance between the first and second optical layer is adjustable upon application of the electrical voltage.

In FIG. 3a, a first mode of the optical filter arrangement is illustrated by the optical filter arrangement in an upper portion of FIG. 3a. In the first mode, the cut wavelength is set to a first value by application of a first voltage. Moreover, in FIG. 3a, a second mode of the optical filer arrangement is illustrated by the optical filter arrangement in a lower portion of FIG. 3a. In the second mode, the cut wavelength is set to a second value by application of a second voltage.

The first and second optical layers 301, 302, 310, 312 of the optical filter arrangement 300 may be made of a glass material, a plastic material or the like.

As shown in FIG. 3a, the electro active polymer material 304, arranged between the first and second optical layers 301, 302 may be in a shape of a helix, which thereby defines an air gap 303 between the first and second optical layers. The helix may be arranged at the periphery of the first and second optical layers 301, 302.

As depicted by FIG. 3b, the electro active polymer material 304 is in the shape of a first and a second electro active polymer layer 306, 308. The first and second electro active polymer layers 306, 308 have a first and a second refractive index, respectively. The first refractive index may be different from the second refractive index.

Furthermore, according to some embodiments, the optical filter arrangement, shown in FIG. 3b, comprises the first electro active polymer layer 306 being coated with a first transparent conducting layer. In some embodiments, the second electro active polymer layer 308 may be coated with a second transparent conducting layer. The first and the second transparent conducting layer may each enable a specific refracting index inserted in the stack comprising the first and second optical layer. Examples of the first and second optical layers are illustrated by the first and second optical layers 310, 312. The first and second optical layers may be absorbing filters, as interference filters or a combination thereof.

According to some embodiments, the optical filter arrangement may comprise at least a third electro active polymer layer. Notably, the present solution is applicable to any number of electro active polymer layers.

For illustration purposes only, when for instance the cut of wavelength is to be moved (or adjusted) from 670 nm to 800 nm, the filter thickness has to increase by voltage activating the electro active polymer layer from 700 nm to 860 nm.

According to some embodiments, the electro active polymer layers may be made out of stacked Polyvinylidene fluoride (PVDF) layers coated with a transparent conducting layer of Graphene.

According to some embodiments, for example as depicted by FIG. 2b, the camera unit 206 for the wireless device comprises the optical filter arrangement 212, which may be located in front of the camera unit 206 which involves the second detecting unit.

Further according to some embodiments as depicted by FIG. 2b, the first detecting unit 202 for the wireless device comprises the optical filter arrangement 212, where the optical filter arrangement 212 may be located in front of the first detecting unit 202. The first detecting unit 202 may act as an ambient light detecting unit and/or as a proximity detecting unit.

According to some embodiments, the wireless device 200 comprise a control unit 216 configured to apply the electrical voltage.

According to some embodiments, the wireless device 200 is configured to receive data from the first 202 or second 210 detecting unit, which data represents detected light. Thereby, thickness of the electro active polymer material 304 may be adapted in dependence of the received data.

Further according to some embodiments, the wireless device 200 comprises the second detecting unit 210 for detecting ambient light and/or proximity controlled by the controlling unit 216.

This voltage controlled optical filter arrangement 212 may act, when used in front of the camera with the second detecting unit 210 or the first detecting unit 202, as an band pass filter in the IR spectrum that can be switched on or off in response to application of the electrical voltage.

Figure 1A:
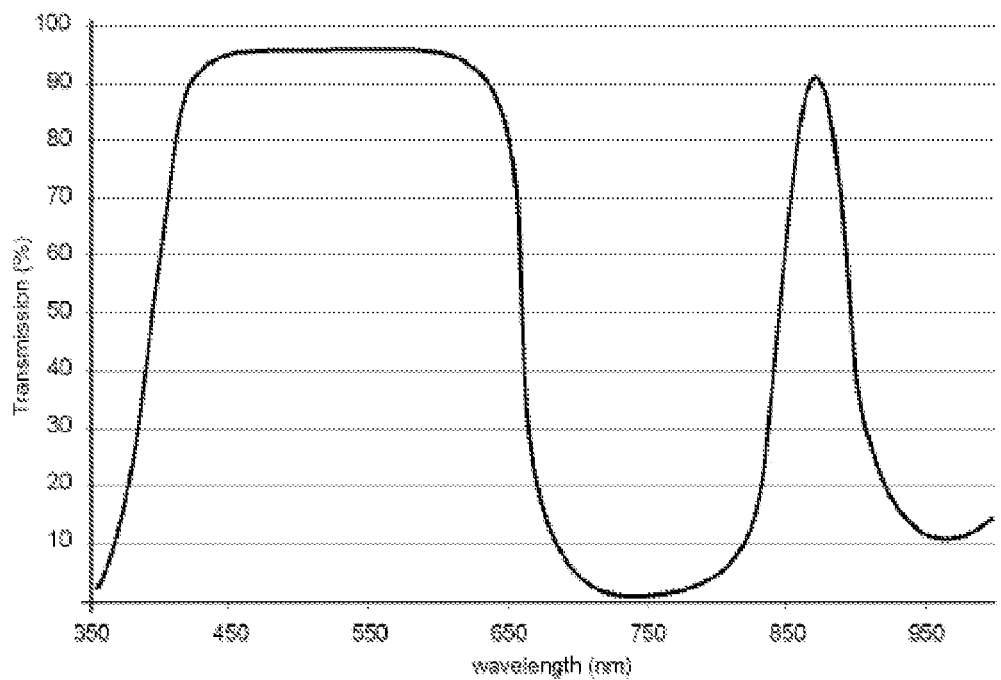
FIG. 1a illustrates a "notch" filter characteristics.
Figure 1B:
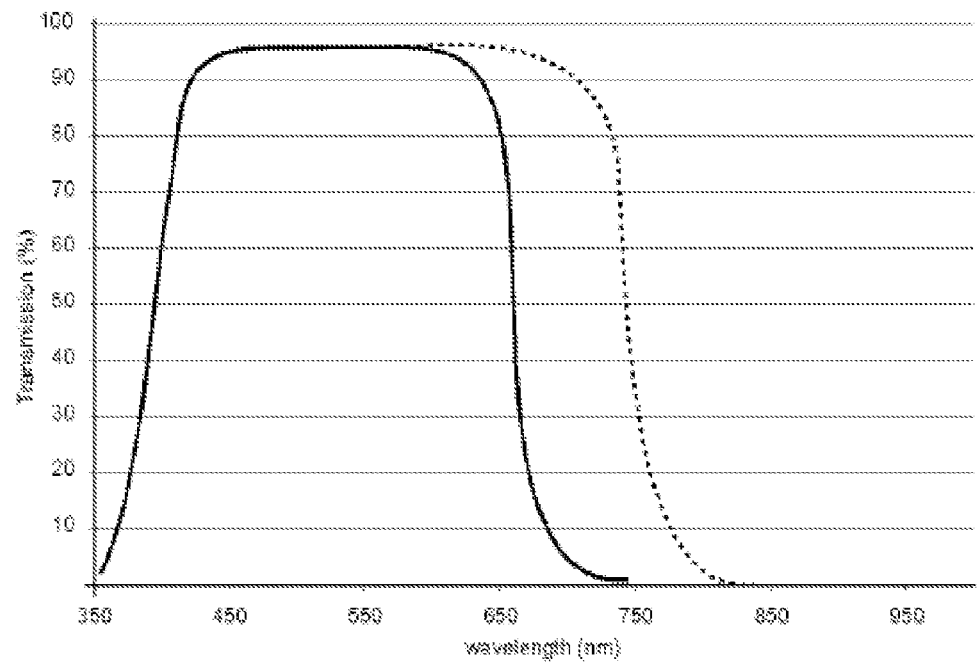
FIG. 1b illustrates a "notch" filter characteristics cut of wavelength towards higher wavelength.

The FIG. 1b illustrates how the transmittance as a function of wavelength would look when the filter is enabling IR light. Typically, the used IR window would be located in the range of 800 to 1000 nm where an ordinary camera with the second detecting unit has good sensitivity. To enable this, an IR LED may be used for illumination.

According to some of the embodiments the camera 206 may be used for 3D gesture sensing. Thereby, by using the presented solution of the optical filter arrangement and an IR LED the camera 206 may be sensible for gestures when the gestures are illuminated with the IR LED. This is enabled under conditions of complete darkness and under all other lightning conditions without any distortion of the pictures.

According to some embodiments, the camera 206 may use the above mentioned night vision feature together with the IR illumination from the IR LED. For instance when the IR sensitivity is needed a voltage is applied to a PVDF layer which will adapt the thickness of the PVDF layer in order to obtain useful light conditions for the camera 206. Such a situation may be under low light conditions.

According to some embodiments, the filter may be used in front of the first detecting unit 202 such as opto-diode or opto-transistor. It may thereby enable the use of the one first detecting unit 202 acting both as ambient light detecting unit which is sensitive only in the visible wavelength range and as a proximity detecting unit which needs sensitivity in the IR wavelength range. The optical proximity detecting unit may be used in phones with touch display in order to prevent accidental activation by the ear or cheek during a phone call.

Figure 4:
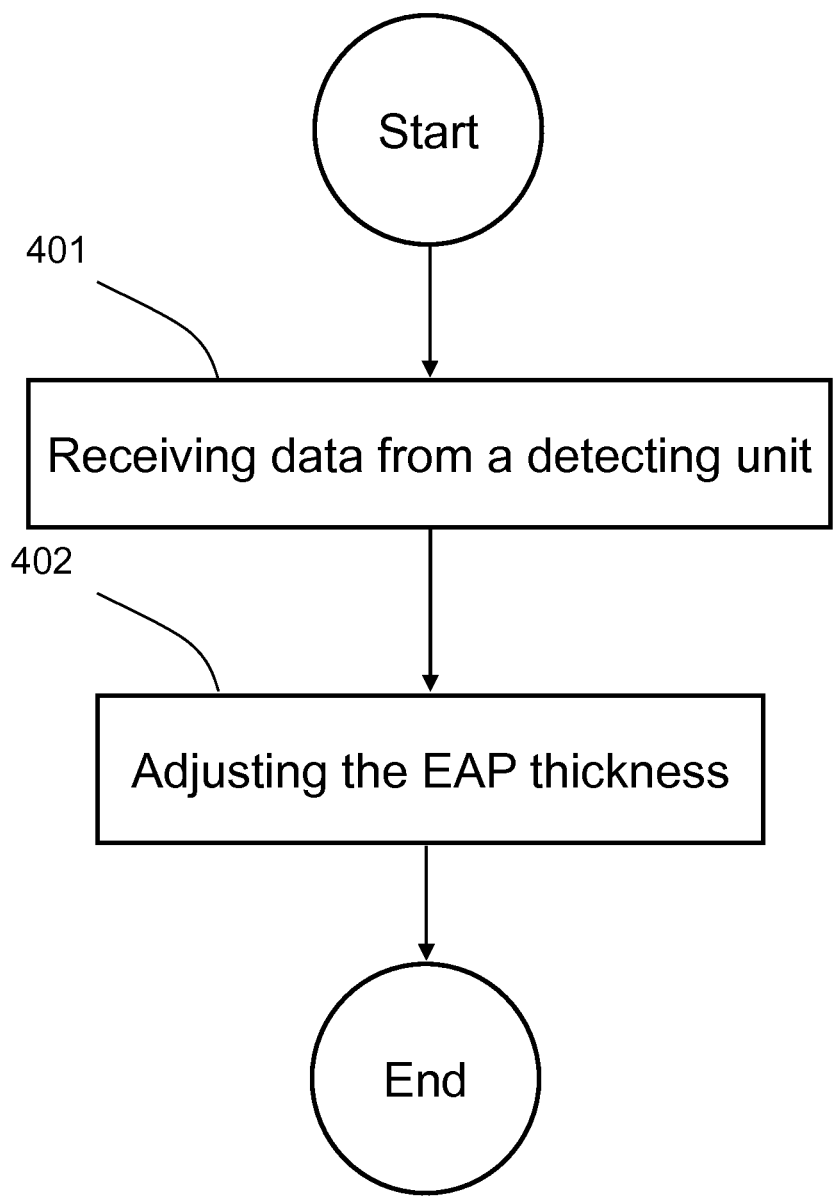
FIG. 4 is a flow chart of depicting a method in the wireless device.

An exemplifying method for adjusting a cut wavelength of an optical filter arrangement 300 in a wireless device 200 will now be described with reference to a flow chart depicted in FIG. 4. The optical filter arrangement comprises an electro active polymer material 304 arranged between a first and a second optical layer of the optical filter arrangement. The following steps may be performed.

401. The control unit 216 receives data from a detecting unit, comprised in the wireless device 200 and configured to detect incoming light, the data being representative of light detected by the detecting unit.

402. The control unit 216 applies an electrical voltage to the electro active polymer material 304 in dependence of the received data such that thickness of the electro active polymer material 304 is adjusted, whereby the cut wavelength is adjusted.

The present method can be implemented through one or more control units, such as the control unit 216 in the wireless device 200 depicted in FIG. 2, together with computer program code for performing the functions of the invention. Such program code may be loaded from the memory 218. The program code mentioned above may also be provided as a computer program product, for instance in the form of a data carrier carrying computer program code for performing the present method when being loaded into the wireless device 200. One such carrier may be in the form of a CD ROM disc. It is however feasible with other data carriers such as a memory stick. The computer program code can furthermore be provided as pure program code on a server and downloaded to the wireless device 200 remotely.

However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Well-known functions or constructions may not be described in detail for brevity and/or clarity.

Embodiments according to the present invention are described with reference to block diagrams and/or operational illustrations of methods and the wireless device 200. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analogue and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

In drawings and specification and specification, there have been disclosed exemplary embodiments of the invention. However, many variations and modifications can be made to these embodiments without substantially departing from the principles of the present solution. Accordingly, although specific terms are employed, they are used in a generic and descriptive sense only and not for the purposes of limitation, the scope of the invention being defined by the following claims.

The invention claimed is:

1. An optical filter arrangement, having a cut wavelength for light passing there through, configured to be positioned in a wireless device relative to a light detecting unit, the optical filter arrangement comprising
   a stack of a first optical layer and a second optical layer, and
   an electro active polymer material arranged between the first and second optical layers such that the cut wavelength is adjusted upon application of an electrical voltage to the electro active polymer material;
   wherein the optical filter arrangement is a switchable band pass filter in an infrared spectrum, and the optical filter arrangement is positioned in front of the light detecting unit relative to a direction of the passing light;
   wherein a thickness of the electro active polymer material changes upon the application of the electrical voltage, which changes a distance between the first optical layer and the second optical layer to adjust the cut wavelength; and
   wherein the electro active polymer material is in a shape of a helix and arranged at a periphery of the first and second optical layers to define an air gap between the first and second optical layers.

2. A first detecting unit for a wireless device comprising the optical filter arrangement according to claim 1, wherein the electrical voltage is applicable such that the first detecting unit acts as an ambient light detecting unit or as a proximity detecting unit.

3. A wireless device, comprising the optical filter arrangement according to claim 1, and a control unit configured to apply the electrical voltage.

4. The wireless device according to claim 3, wherein the control unit further is configured to receive data from a first or a second detecting unit, the data being representative of light detected by the first or the second detecting unit, the control unit further being configured to apply the electrical voltage in dependence of the received data.

5. The wireless device according to claim 4, further comprising the second detecting unit with the optical filter arrangement for detecting ambient light, wherein the second detecting unit is connected to the control unit.

* * * * *